(12) United States Patent
Yu et al.

(10) Patent No.: US 11,463,649 B2
(45) Date of Patent: Oct. 4, 2022

(54) DISPLAY DEVICE AND DISPLAY IMAGE ROTATION ADAPTING METHOD

(71) Applicant: Hisense Visual Technology Co., Ltd., Qingdao (CN)

(72) Inventors: Yanmei Yu, Qingdao (CN); Shuo Zhu, Qingdao (CN); Dayong Wang, Qingdao (CN); Meiyan Sun, Qingdao (CN)

(73) Assignee: Hisense Visual Technology Co., Ltd., Qingdao (CN)

( * ) Notice: Subject to any disclaimer, the term of this patent is extended or adjusted under 35 U.S.C. 154(b) by 0 days.

(21) Appl. No.: 17/349,324

(22) Filed: Jun. 16, 2021

(65) Prior Publication Data

US 2021/0314520 A1    Oct. 7, 2021

Related U.S. Application Data

(63) Continuation of application No. PCT/CN2020/082088, filed on Mar. 30, 2020.

(30) Foreign Application Priority Data

Mar. 13, 2020 (CN) .......................... 202010176794.2

(51) Int. Cl.
*H04N 5/655* (2006.01)
*H04N 21/485* (2011.01)
*H04N 17/04* (2006.01)
*H04N 7/01* (2006.01)

(52) U.S. Cl.
CPC .......... *H04N 5/655* (2013.01); *H04N 7/0122* (2013.01); *H04N 17/04* (2013.01); *H04N 21/4858* (2013.01)

(58) Field of Classification Search
CPC ............ H04N 5/23293; H04N 13/117; H04N 13/344; H04N 7/183; H04N 13/393; H04N 5/225251
See application file for complete search history.

(56) References Cited

U.S. PATENT DOCUMENTS

| 2018/0060015 A1 | 3/2018 | Park et al. |
| 2019/0317549 A1 | 10/2019 | Gurr et al. |
| 2020/0301469 A1* | 9/2020 | Choi ........................ G06T 3/60 |

FOREIGN PATENT DOCUMENTS

| CN | 1685714 A | 10/2005 |
| CN | 101043597 A | 9/2007 |
| CN | 104581405 A | 4/2015 |
| CN | 105230005 A | 1/2016 |
| CN | 111679731 A | 9/2020 |
| WO | WO-2019199502 A1 | 10/2019 |

* cited by examiner

*Primary Examiner* — Samira Monshi
(74) *Attorney, Agent, or Firm* — Harness, Dickey & Pierce, P.L.C.

(57) ABSTRACT

The disclosure provides a display device and a display image rotation adapting method. A rotating component may be controlled to rotate a screen into a portrait mode if a video media resource is a vertical media resource and the screen is in a landscape mode; or, the rotating component may be controlled to rotate the screen into a landscape mode if the video media resource is a horizontal media resource and the screen is in a portrait mode, so as to adapt to an aspect ratio corresponding to the video media resource.

13 Claims, 9 Drawing Sheets

DISPLAY DEVICE AND DISPLAY IMAGE ROTATION ADAPTING METHOD

This application is a continuation application of International Application No. PCT/CN2020/082088 filed Mar. 30, 2020, which claims priority to Chinese Patent Application No. 202010176794.2 filed Mar. 13, 2020. The entire disclosures of the above applications are incorporated herein by reference.

FIELD

The present disclosure relates to smart televisions, in particular to a display device and an image display method.

BACKGROUND

This section provides background information related to the present disclosure which is not necessarily prior art.

A smart television device has an independent operating system and supports function extension. Various applications may be installed in a smart television according to requirements of users, for example, social applications such as traditional video applications and short video applications, and reading applications such as comic books and book reading applications. These applications may display application images on a screen of the smart television to provide rich media resources for the smart television. Meanwhile, the smart television may also interact data and share resources with different terminals. For example, the smart television may be connected with a mobile phone via a local area network, Bluetooth and other wireless communications, so as to play resources from the mobile phone or directly display images from the mobile phone via screen cast.

However, since different applications or media resources from different sources have different display ratios, the smart television usually displays images different from a traditional video ratio. For example, video resources taken via a mobile phone and other terminals are generally vertical media resources with ratios of 9:16, 9:18 and 3:4, while images provided by reading applications are vertical resources similar to books in aspect ratio. The aspect ratio of the smart television screen is generally in a horizontal state of 16:9, so when vertical media resources such as short videos and comics are displayed via the smart television, vertical media resource images cannot be normally displayed due to mismatch of the aspect ratios. Generally, the vertical media resource images can be completely displayed after scaling, which wastes display space on the screen, and brings poor user experience.

SUMMARY

This section provides a general summary of the disclosure, and is not a comprehensive disclosure of its full scope or all of its features.

The disclosure provides a display device and an image display method.

In a first aspect, the disclosure provides a display device, including: a screen; a rotating component, connected with the screen and configured to drive the screen to rotate to make the screen in a rotating state of a landscape mode or a portrait mode; and a controller, connected with the rotating component and the screen. The controller is configured to: detect a current rotating state of the screen in response to a resource play action of the display device; and control the rotating component to rotate the screen into the portrait mode when a video media resource is a vertical media resource and the current rotating state of the screen is the landscape mode.

Based on the display device, the disclosure further provides an image display method, including: detecting a current rotating state of a screen in response to a resource play action of the display device; and controlling a rotating component to rotate the screen into a portrait mode when a video media resource is a vertical media resource and the current rotating state of the screen is a landscape mode.

In a second aspect, the disclosure provides a display device, including: a screen; a rotating component, connected with the screen and configured to drive the screen to rotate to make the screen in a rotating state of a landscape mode or a portrait mode; and a controller, connected with the rotating component and the screen. The controller is configured to: detect a current rotating state of the screen in response to a resource play action of the display device; and control the rotating component to rotate the screen into the landscape mode when a video media resource is a horizontal media resource and the current rotating state of the screen is the portrait mode.

Based on the display device, the disclosure further provides an image display method, including: detecting a current rotating state of a screen in response to a resource play action of the display device; and controlling a rotating component to rotate the screen into a landscape mode when a video media resource is a horizontal media resource and the current rotating state of the screen is a portrait mode.

It can be known from the above technical solutions that the disclosure provides the display device and the image display method, and in practical applications, the current rotating state of the screen is detected in response to the resource play action of the display device. The rotating component may be controlled to rotate the screen into the portrait mode if the video media resource is the vertical media resource and the current rotating state of the screen is the landscape mode; or, the rotating component may be controlled to rotate the screen into the landscape mode if the video media resource is the horizontal media resource and the current rotating state of the screen is the portrait mode. Therefore, the screen automatically rotates to adapt to an aspect ratio corresponding to the video media resource.

In a third aspect, the disclosure provides a display device, including: a screen; a rotating component, connected with the screen and configured to drive the screen to rotate by a preset angle; and a controller, connected with the screen and the rotating component. The controller is configured to: detect a current rotating state of the screen in response to a resource play action of the display device; control the screen to display an image corresponding to a video media resource when an aspect ratio of the video media resource is matched with the current rotating state; and control the rotating component to rotate the screen so as to make the screen adapt to the aspect ratio of the video media resource and play the image corresponding to the video media resource when the aspect ratio of the video media resource is not matched with the current rotating state.

Based on the display device, the disclosure further provides an image display method, including: detecting a current rotating state of a screen in response to a resource play action of the display device; controlling the screen to display an image corresponding to a video media resource when an aspect ratio of the video media resource is matched with the current rotating state; and controlling a rotating component to rotate the screen so as to make the screen adapt to the aspect ratio of the video media resource and play the image corresponding to the video media resource when the aspect ratio of the video media resource is not matched with the current rotating state.

It is known from the above technical solutions that the disclosure provides the display device and the image display method, and in practical applications, the current rotating state of the screen may be detected in response to the resource play action of the display device. The rotating component is controlled to rotate the screen so as to make the screen adapt to the aspect ratio of the video media resource and play the image corresponding to the video media resource if the aspect ratio of the video media resource is not matched with the current rotating state. The display device automatically drives a motor of a television to rotate when detecting that a width and a height of a video which is currently played do not accord with the current rotating state of the screen, and in the rotating process, the image on the screen is synchronously scaled and rotated, so as to avoid a user watching an inclined video image for a long time, so that user experience is improved.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Figure 1A:
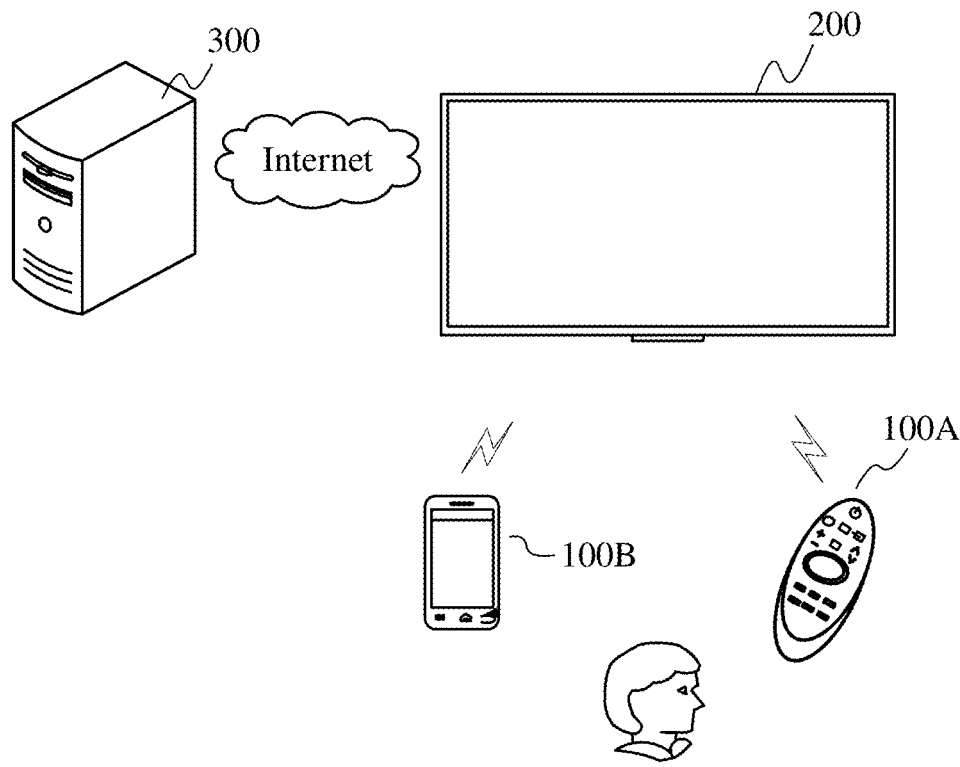
FIG. 1A illustrates an application scenario of a display device according to some embodiments of the disclosure.

Example embodiments will now be described more fully with reference to the accompanying drawings.

A rotating screen television is a novel smart television, and mainly includes a display and a rotating component. The display screen is fixed to a wall or a bracket via the rotating component, and an angle of the display screen is adjusted via the rotating component to rotate, so as to adapt to display images with different aspect ratios. For example, in most cases, the display screen is placed horizontally to display video images with the aspect ratios of 16:9, 18:9, etc. When the aspect ratios of the video images are 9:16, 9:18, etc., the images need to be scaled on the horizontally placed display, and black regions are displayed on two sides of the display screen. Therefore, the display screen may be vertically placed via the rotating component to adapt to the video images with the aspect ratios of 9:16, 9:18, etc.

In order to facilitate users displaying target media resource detail pages under different rotating states of the display and facilitate improving users' viewing experience under different viewing states of a display device, embodiments of the disclosure provide a display device, a detail page display method and a computer storage medium, where the display device is a rotating screen television, for example. It should be noted that the method according to the embodiments is not only suitable for the rotating screen television, but also other display devices, such as a computer, a tablet computer, etc.

A term "module" used in the embodiments of the disclosure may refer to any known or later developed combination of hardware, software, firmware, artificial intelligence, fuzzy logics, or hardware or/and software codes, that can perform functions related to the element.

A term "remote controller" used in the embodiments of the disclosure refers to a component in an electronic device (e.g., the display device disclosed in the disclosure), and the component usually may wirelessly control the electronic device within a short distance range. The component generally may be connected with the electronic device via infrared rays and/or radio frequency (RF) signals and/or Bluetooth, and may also include WiFi, wireless USBs, Bluetooth, motion sensors and other functional modules. For example, a handheld touch remote controller replaces most physical built-in hard keys in a common remote control apparatus with a user interface in a touch screen.

A term "gesture" used in the embodiments of the disclosure refers to user behaviors that a user uses to expresses expected ideas, motions, objectives or results through hand shape change or hand motions.

A term "hardware system" used in the embodiments of the disclosure may refer to hardware parts with computing, control, storage, input and output functions and constituted by mechanical, optical, electric and magnetic devices such as an integrated circuit (IC) and a printed circuit board (PCB). In the embodiments of the disclosure, a hardware system also may be referred to as a motherboard or a main chip or a controller usually.

FIG. 1A illustrates an application scenario of a display device according to some embodiments of the disclosure. As shown in FIG. 1A, a control apparatus 100 and a display device 200 may communicate in a wired or wireless way.

The control apparatus 100 is configured to control the display device 200, and may receive operation commands input from a user and convert the operation commands to instructions that can be recognized and responded by the display device 200, thereby playing an intermediary role for interaction between the user and the display device 200. For example, the user operates channel up/down keys on the control apparatus 100, and the display device 200 responds by channel up/down operations.

The control apparatus 100 may be a remote controller 100A, including infrared protocol communication or Bluetooth protocol communication, and other short-distance communication ways, and controls the display device 200 in a wireless way or other wired ways. The user may control the display device 200 by inputting user commands through keys on the remote controller, voice input, control panel input, etc. For example, the user may control functions of the display device 200 by inputting corresponding control commands through volume up/down keys, channel control keys, up/down/left/right directional keys, voice input keys, menu keys, a power key and the like on the remote controller.

The control apparatus 100 may also be a smart device, such as a mobile terminal 100B, a tablet computer, a computer and a laptop. For example, the display device 200 is controlled by using applications running on the smart device. Through configuration, the applications may provide the user various controls through a visual user interface (UI) on a screen associated with the smart device.

Exemplarily, the mobile terminal 100B and the display device 200 may install software applications and achieve connection and communication through a network communication protocol, so as to achieve the purposes of one-to-one operation control and data communication. For example, the mobile terminal 100B and the display device 200 may build a control protocol, and functions of physical keys on the remote controller 100A are realized by operating various function keys or virtual controls of the user interface on the mobile terminal 100B. Audio and video contents displayed on the mobile terminal 100B may also be transmitted to the display device 200 to achieve a synchronous display function.

The display device 200 may provide a broadcast receiving function and a network television function supported by a computer, and may be implemented as a digital television, a network television, an internet protocol television (IPTV), etc.

The display device 200 may be a liquid crystal display, an organic light emitting display and a projection device. Specific display device types, dimensions, resolutions, etc. are not limited.

The display device 200 further performs data communication with a server 300 in various communication ways. Herein, the display device 200 may be allowed to perform communication connection through a local area network (LAN), a wireless local area network (WLAN) and other networks. The server 300 may provide various contents and interactions to the display device 200. Exemplarily, the display device 200 may send and receive messages, for example, receiving data of an electronic program guide (EPG), receiving software updates, or accessing a digital media library for remote storage. There may be one set of servers 300, or many sets of servers 300, or one or more types of servers. The server 300 is used for providing videos on demands, advertisement services and other network service contents.

Figure 1B:
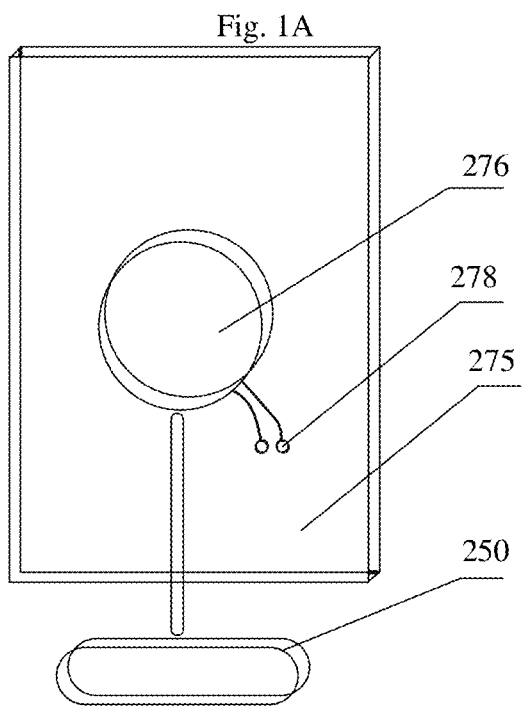
FIG. 1B is a rear view of a display device according to some embodiments of the disclosure.

In some embodiments, as shown in FIG. 1B, the display device 200 include a rotating component 276, a controller 250, a screen 275, terminal interfaces 278 extending out of a gap in a backplane and a rotating component 276 connected with the backplane. The rotating component 276 may rotate the screen 275. Viewed from the front of the display device, the rotating component 276 may rotate the display to a portrait mode, i.e., a state that a vertical side length of a screen is greater than a horizontal side length, and the screen may also be rotated to a landscape mode, i.e., a state that the horizontal side length of the screen is greater than the vertical side length.

Figure 2:
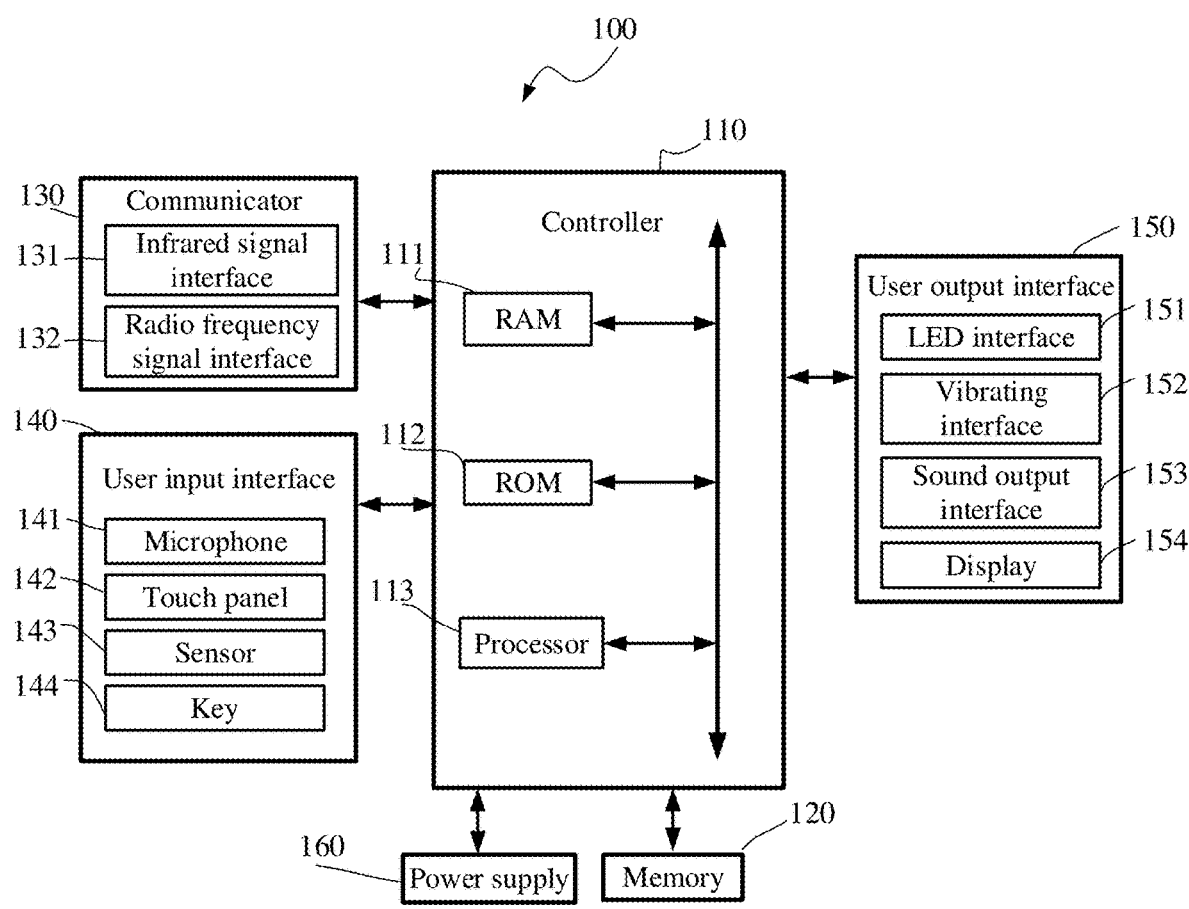
FIG. 2 is a hardware configuration block diagram of a control apparatus 100 in FIG. 1A according to some embodiments of the disclosure.

FIG. 2 exemplarily shows a configuration block of the control apparatus 100. As shown in FIG. 2, the control apparatus 100 includes one or more of a controller 110, a memory 120, a communicator 130, a user input interface 140, a user output interface 150 and a power supply 160.

In some exemplary embodiments, control apparatuses may not have the user output interface 150.

The controller 110 includes a random access memory (RAM) 111, a read-only memory (ROM) 112, a processor 113, a communication interface and a communication bus. The controller 110 is configured to control running and operations of the control apparatus 100, as well as communication cooperation between internal parts, and external and internal data processing functions.

Exemplarily, when detecting interactions that a user presses keys on the remote controller 100A or touches a touch panel on the remote controller 100A, the controller 110 may control to generate signals corresponding to the detected interactions and send the signals to the display device 200.

The memory 120 is configured to store various running applications, data and applications which drive and control the control apparatus 100 under the control of the controller 110. The memory 120 may store various controlling signal commands input from the user.

The communicator 130 communicates control signals and data signals with the display device 200 under the control of the controller 110. For example, the control apparatus 100 sends the control signals (e.g., touch signals or control signals) to the display device 200 via the communicator 130, and the control apparatus 100 may receive signals sent from the display device 200 via the communicator 130. The communicator 130 may include an infrared signal interface 131 and a radio frequency signal interface 132. For example, with the infrared signal interface, the commands input from the user need to be converted into infrared control signals according to an infrared control protocol, and then the infrared control signals are sent to the display device 200 via an infrared sending module. For another example, with the radio frequency signal interface, the commands input from the user need to be converted into digital signals, and after being modulated according to a radio frequency control signal modulating protocol, the digital signals are sent to the display device 200 via a radio frequency sending terminal.

The user input interface 140 may include at least one of a microphone 141, a touch panel 142, a sensor 143 and a key 144, so that the user may input user commands about controlling the display device 200 to the control apparatus 100 through voice, touch, gestures, pressing and the like.

The user output interface 150 is configured to output the user commands received via the user input interface 140 to the display device 200, or output images or voice signals received by the display device 200. Herein, the user output interface 150 may include an LED interface 151, a vibrating interface 152 for producing vibrations, a sound output interface 153 for outputting sounds, a display 154 for outputting images, etc. For example, the remote controller 100A may receive output signals such as audio signals, video signals or data signals from the user output interface 150, display the output signals in an image form on the display 154, output the output signals in an audio form at the sound output interface 153, or output the output signals in a vibration form at the vibrating interface 152.

The power supply 160 is configured to provide running power support for elements of the control apparatus 100 under the control of the controller 110. The form of the power supply may be a battery and related control circuits.

Figure 3:
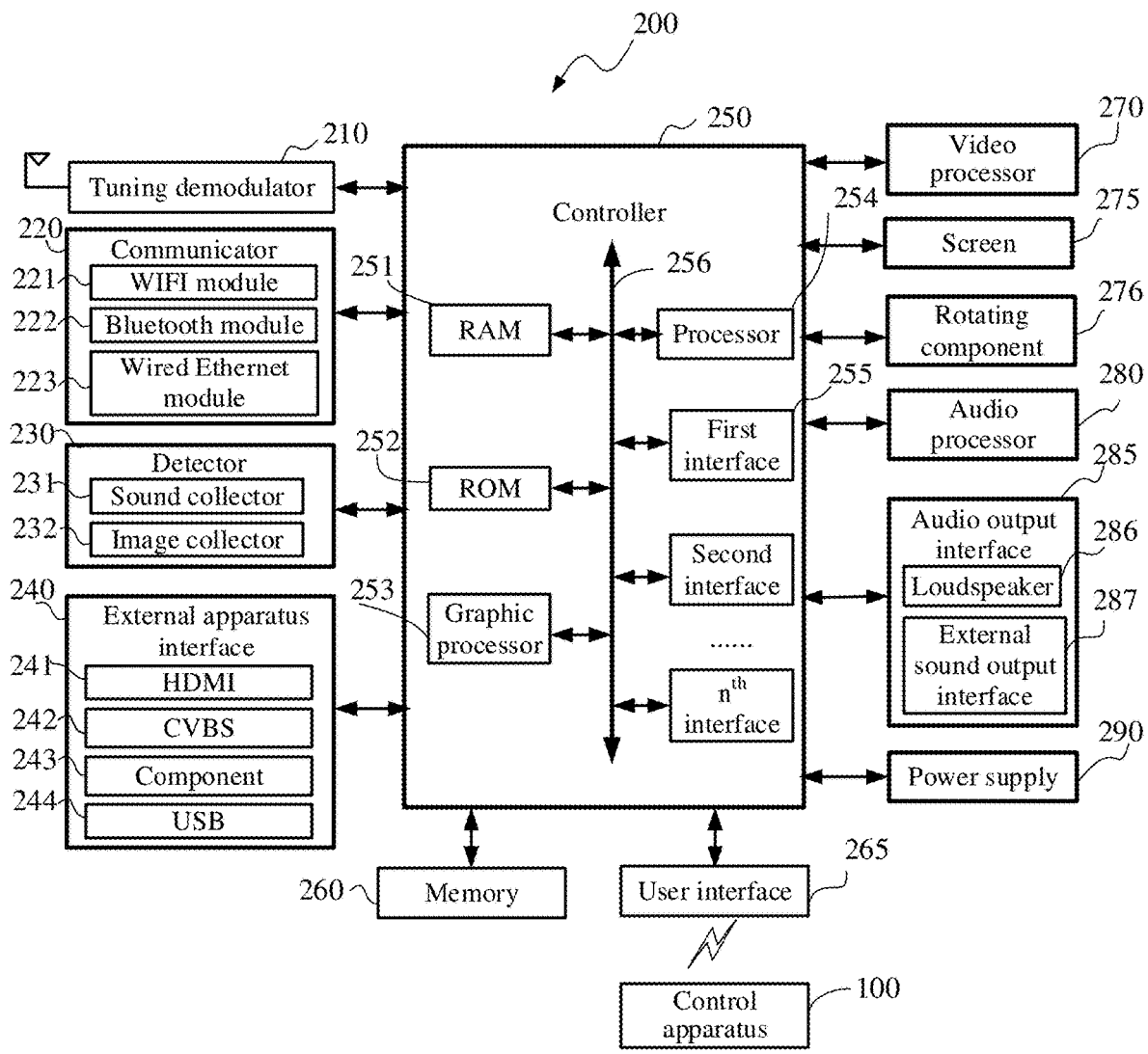
FIG. 3 is a hardware configuration block diagram of a display device 200 in FIG. 1A according to some embodiments of the disclosure.

FIG. 3 exemplarily shows a hardware configuration block diagram of the display device 200. As shown in FIG. 3, the display device 200 includes a tuning demodulator 210, a communicator 220, a detector 230, an external apparatus interface 240, a controller 250, a memory 260, a user interface 265, a video processor 270, a screen 275, a rotating component 276, an audio processor 280, an audio output interface 285 and a power supply 290.

The rotating component 276 may include a driving motor, a rotating shaft and other parts. The driving motor is connected with the controller 250 and controlled by the controller 250 to rotate a certain angle. One end of the rotating shaft is connected with a power output shaft of the driving motor, and the other end is connected with the screen 275, so that the screen 275 may be fixedly mounted on a wall or a bracket through the rotating component 276.

The rotating component 276 further includes other parts, such as a transmission element and a detecting element. The transmission element may adjust a rotating speed and a moment output by the rotating component 276 through a specific transmission ratio, where a gear transmission manner may be adopted. The detecting element includes sensors disposed on the rotating shaft, such as an angle sensor and a posture sensor. These sensors may detect parameters, such as a rotating angle, of the rotating component 276 and send the detected parameters to the controller 250, so that the controller 250 can judge or adjust a state of the display device 200 according to the detected parameters. In practical applications, the rotating component 276 may include, but not limited to, one or more of the above parts.

The tuning demodulator 210 receives radio and television signals in a wired or wireless way, may perform modulating and demodulating processing such as amplification, frequency mixing and resonance, and is configured to demodulate audio and video signals carried in a frequency of a television channel selected by the user and additional information (e.g., EPG data) from a plurality of wireless or wired radio and television signals.

The tuning demodulator 210 may be controlled by the controller 250 to respond the frequency of the television channel selected by the user and the television signals carried in the frequency according to user's choices.

The tuning demodulator 210 has many ways to receive signals according to different broadcast systems of television signals, for example: terrestrial broadcasting, wired broadcasting, satellite broadcasting or internet broadcasting; a digital modulating way or an analog modulating way may be adopted according to different modulating types; and analog signals and digital signals may be demodulated according to different types of received television signals.

In some other exemplary embodiments, the tuning demodulator 210 may also be disposed in an external device such as an external set top box. In this way, the set top box outputs the television signals after modulation and demodulation, and inputs the signals to the display device 200 through the external apparatus interface 240.

The communicator 220 is a component for communication according to various communication protocol types and external devices or external servers. For example, the display device 200 may send content data to an external device connected with the communicator 220, or, browse and download content data from the external device connected with the communicator 220. The communicator 220 may include a WIFI module 221, a Bluetooth communication protocol module 222, a wired Ethernet communication protocol module 223 and other network communication protocol modules or near-field communication protocol modules, so that the communicator 220 may receive control signals of the control apparatus 100 under the control of the controller 250, and implement the control signals as WIFI signals, Bluetooth signals, radio frequency signals, etc.

The detector 230 is a component for collecting external environment signals or interacting signals with the outside by the display device 200. The detector 230 may include a sound collector 231, such as a microphone, to receive user's sounds (e.g., voice signals of the user control commands of the display device 200), or to collect environment sounds which are used for identifying environment scenario types, so as to make the display device 200 self-adaptive to environment noise.

In some other exemplary embodiments, the detector 230 may also include an image collector 232, such as a camera, to collect external environment scenarios so as to self-adaptively change display parameters of the display device 200, or to collect user's attributes or interact gestures with the user, so as to achieve an interaction function between the display device and the user.

In some other exemplary embodiments, the detector 230 may also include an optical receiver to collect environment light intensity, so as to be self-adaptive to the change of the display parameters of the display device 200.

In some other exemplary embodiments, the detector 230 may also include a temperature sensor, for example, by sensing an environment temperature, the display device 200 may self-adaptively adjust a display color temperature of an image. Exemplarily, when in an environment with a relatively high temperature, the color temperature of the image displayed by the display device 200 may be adjusted as a relatively cool tone, and when in an environment with a relatively low temperature, the color temperature of the image displayed by the display device 200 may be adjusted as a relatively warm tone.

The external apparatus interface 240 is a component for the controller 250 to control data transmission between the display device 200 and external devices. The external apparatus interface 240 may be connected with the external devices such as a set top box, a game apparatus and a laptop in a wired/wireless way, and may receive data of the external devices, such as video signals (e.g., motion images), audio signals (e.g., music) and additional information (e.g., EPG).

The external apparatus interface 240 may include one or more of a high definition multimedia interface (HDMI) interface 241, a composite video blanking and synchronization (CVBS) interface 242, an analog or digital component interface 243, a universal serial bus (USB) interface 244, a component interface(not shown), a red-green-blue (RGB) interface (not shown), etc.

The controller 250 controls the display device 200 to work and respond user's operations by running various software control programs (e.g., an operating system and various applications) stored on the memory 260.

As shown in FIG. 3, the controller 250 includes a random access memory (RAM) 251, a read-only memory (ROM) 252, a graphic processor 253, a CPU 254, a communication interface 255, and a communication bus 256. The RAM 251, the ROM 252, the graphic processor 253, the CPU 254 and the communication interface 255 are connected through the communication bus 256.

The ROM 252 is configured to store various system starting instructions. For example, when receiving a start signal, a power supply of the display device 200 begins to be started, and the CPU 254 runs the system starting instructions in the ROM 252 to copy the operating system stored in the memory 260 to the RAM 251, so as to begin initialization of the operating system. After the operating system is started, the CPU 254 copies various applications in the memory 260 to the RAM 251, and then the various applications begin to be started.

The graphic processor 253 is configured to produce various graphic objects, such as an icon, an operating menu and a user input instruction display graphic. The graphic processor 253 may include an arithmetic unit, configured to perform operations by receiving various interaction commands input from the user so as to display various objects according to display attributes; and a renderer, configured to produce the various objects obtained based on the arithmetic unit so as to display rendering results on the screen 275.

The CPU 254 is configured to execute the operating system and application instructions stored in the memory 260, and execute processing of various applications, data and contents according to the received user input instructions, so as to eventually display and play various audio and video contents.

In some exemplary embodiments, the CPU 254 may include a plurality of processors which may include one main processor and one or more sub-processors. The main processor is configured to execute some initialization operations of the display device 200 in a pre-loading mode of the display device, and/or, display images in a normal mode. The one or more sub-processors are configured to execute operations in a display device standby mode and other states.

The communication interface 255 may include a first interface to an $n^{th}$ interface. These interfaces may be network interfaces connected to the external devices via a network.

The controller 250 may control overall operations of the display device 200. For example, in response to receiving a user input instruction for selecting a GUI object displayed on the screen 275, the controller 250 may execute an operation related to the object selected by the user input instruction.

The object may be any one of optional objects, such as a hyperlink or an icon. The operation related to the selected object is, for example, an operation of displaying connection to a hyperlink page, a document, an image and the like, or an operation of launching an application corresponding to the object. The user input instruction for selecting the GUI object may be an instruction input through various input apparatuses (e.g., a mouse, a keyboard, a touch panel and the like) connected to the display device 200, or a voice instruction corresponding to a speech spoken by the user.

The memory 260 is configured to store various types of data, software programs or applications for driving and controlling the display device 200 to operate. The memory 260 may include a volatile and/or nonvolatile memory. The term "memory" includes the memory 260, the RAM 251 and the ROM 252 of the controller 250, or a memory card in the display device 200.

In some embodiments, the memory 260 is specifically configured to store running programs for driving the controller 250 in the display device 200, store various applications built in the display device 200 and downloaded by the user from the external devices, and store data which are used to configure various GUIs provided by the screen 275, various objects related to the GUIs, and a visual effect image of a selector for selecting the GUI objects.

In some embodiments, the memory 260 is specifically configured to store driving programs and related data of the tuning demodulator 210, the communicator 220, the detector 230, the external apparatus interface 240, the video processor 270, the screen 275, the audio processor 280, etc., for example, external data (e.g., audio and video data) received from the external apparatus interface, or user data (e.g., key information, voice information, touch information, etc.) received from the user interface.

In some embodiments, the memory 260 specifically stores software and/or programs for representing the operating system (OS), and these software and/or programs may include, for example: a kernel, middleware, an application interface (API) and/or an application. Exemplarily, the kernel may control or manage system resources, and functions implemented by other programs (e.g., the middleware, the API or the application). Meanwhile, the kernel may provide an interface to allow the middleware, the API or the application to access the controller, so as to control or manage the system resources.

Figure 4:
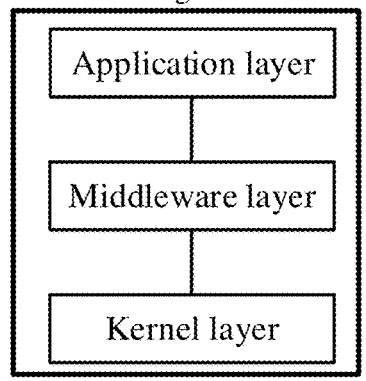
FIG. 4 is an architecture configuration block diagram of an operating system in a memory of a display device 200 according to some embodiments of the disclosure.

FIG. 4 exemplarily shows an architecture configuration block diagram of the operating system in the memory of the display device 200. Architecture of the operating system is an application layer, a middleware layer and a kernel layer from top to bottom.

Built-in applications of the system and non-system-level applications both belong to the application layer. The application layer is responsible for direct interaction with the user. The application layer may include a plurality of applications, such as a setting application, an e-post application, a media center application, etc. These applications may be implemented as Web applications, which are executed based on a WebKit engine, specifically, may be developed and executed based on HTML5, a cascading style sheet (CSS) and JavaScript.

Herein, HTML (HyperText Markup Language) is a standard markup language for creating pages. The pages are described through markup labels, HTML labels are used to explain texts, graphs, animations, sounds, tables, links and the like, and a browser can read an HTML document, explain contents of the labels in the document and display the contents in a page form.

The CSS, with the full name of Cascading Style Sheet, is a computer language for expressing an HTML file style, and may be used to define a style structure, such as a font, a color, a position and the like. A CSS style may be directly stored in an HTML page or an independent style file to control styles in pages.

JavaScript, as a language applied to Web page programming, may be inserted into an HTML page and explained and executed by a browser. Interaction logics of the Web applications are implemented through JavaScript. JavaScript can encapsulate a JavaScript extension interface through the browser to implement communication with the kernel layer.

The middleware layer may provide some standard interfaces to support operations of various environments and systems. For example, the middleware layer may be implemented as a multimedia and hypermedia expert group (MHEG) of middleware related to data broadcasting, DLNA middleware of middleware related to external device communication, and also middleware providing browser environments where applications in the display device run.

The kernel layer provides core system services, such as file management, memory management, process management, network management, and system security permission management. The kernel layer may be implemented as kernels based on various operating systems, such as a kernel of a Linux operating system.

The kernel layer also provides communication between system software and hardware so as to provide device driving services for various hardware, for example, providing a display driving program for the display, providing a camera driving program for a camera, providing a key driving program for the remote controller, providing a WiFi driving program of the WIFI module, providing an audio driving program for an audio output interface, and providing power management driving for a power management (PM) module.

In FIG. 3, the user interface 265 receives various user interactions. Specifically, the user interface is configured to send input signals of the user to the controller 250, or transmit output signals of the controller 250 to the user. Exemplarily, the remote controller 100A may send input signals, such as a power on/off signal, a channel selecting signal and a volume adjusting signal, input from the user to the user interface 265, and then transfers the input signals to the controller 250 through the user interface 265. Alternatively, the remote controller 100A may receive output signals, such as audio signals, video signals or data signals, processed by the controller 250 and output from the user interface 265, and display the received output signals or output the received output signals in an audio or vibration form.

In some embodiments, the user may input user commands on a graphic user interface (GUI) displayed on the screen 275, and the user interface 265 receives the user input commands through the GUI. To be exact, the user interface 265 may receive a user input instruction for controlling the position of the selector in the GUI so as to select different objects or items. The "user interface" is a medium interface for interaction and information exchange between applications or an operating system and a user, and it realizes conversion between an internal form of information and a user-acceptable form. A common expression form of the user interface is the graphic user interface (GUI), which refers to a user interface related to computer operations and displayed in a graphic manner. The user interface may be an icon, a window, a control and other interface elements displayed in a display of an electronic device, where the control may include visual interface elements such as an icon, a control, a menu, a tab control, a text box, a dialog box, a status bar, a channel bar, and Widget.

Alternatively, the user may input the user commands by inputting specific sounds or gestures, and the user interface 265 recognizes the sounds or gestures through sensors so as to receive the user input commands.

The video processor 270 is configured to receive external video signals, and perform video data processing such as decompression, decoding, scaling, noise reduction, frame rate conversion, resolution conversion and image synthesis according to standard encoding and decoding protocols of input signals, so as to obtain video signals that are directly displayed or played on the screen 275.

Exemplarily, the video processor 270 includes a demultiplexing module, a video decoding module, an image synthesis module, a frame rate conversion module, a display formatting module, etc.

The demultiplexing module is configured to perform demultiplexing on input audio and video data streams, and if an MPEG-2 stream (based on a compression standard of digital storage media motion images and voice) is input, the demultiplexing module performs demultiplexing on the stream into video signals, audio signals, etc.

The video decoding module is configured to process the video signals after demultiplexing, including decoding and scaling processing.

The image synthesis module, such as an image synthesizer, is configured to perform superposing and mixing processing on a graph builder and scaled video images according to GUI signals which are input from the user or self-generated, so as to generate image signals that can be displayed.

The frame rate conversion module is configured to convert the frame rate of an input video, for example, the frame rate of an input 60 Hz video is converted into 120 Hz or 240 Hz, and a common format is realized by frame interpolation.

The display formatting module is configured to convert signals output from the frame rate conversion module into signals which meet, for example, a display format of the display. For instance, the signals output from the frame rate conversion module go through format conversion to output RGB data signals.

The screen 275 is configured to receive the image signals input from the video processor 270 so as to display video contents, images and a menu control interface. The displayed video contents may be from video contents in the broadcast signals received by the tuning demodulator 210, and also video contents input from the communicator 220 or the external apparatus interface 240. The screen 275 also displays a user control interface UI produced in the display device 200 and used to control the display device 200.

The screen 275 may include a display component for presenting images and a driving component for driving image displaying. Alternatively, if the screen 275 is a projection display, it may also include a projection apparatus and a projection screen.

The rotating component 276 may rotate the screen 275 according to a controlling signal sent by the controller.

The audio processor 280 is configured to receive an external audio signal, and perform audio data processing such as decompression, decoding, noise reduction, digital-analog conversion and amplification according to standard encoding and decoding protocols of input signals, so as to obtain audio signals that can be played in a loudspeaker 286.

Exemplarily, the audio processor 280 may support various audio formats, such as MPEG-2, MPEG-4, advanced audio coding (AAC), high-efficiency AAC (HE-AAC), etc.

The audio output interface 285 is configured to receive audio signals output from the audio processor 280 under the control of the controller 250, and the audio output interface 285 may include the loudspeaker 286, or an external sound output interface 287 for outputting to an external device, such as an earphone output.

In some other exemplary embodiments, the video processor 270 may include one or more chips. The audio processor 280 may also include one or more chips.

In some other exemplary embodiments, the video processor 270 and the audio processor 280 may be separate chips, and may also be integrated with the controller 250 in one or more chips.

Figure 5A:
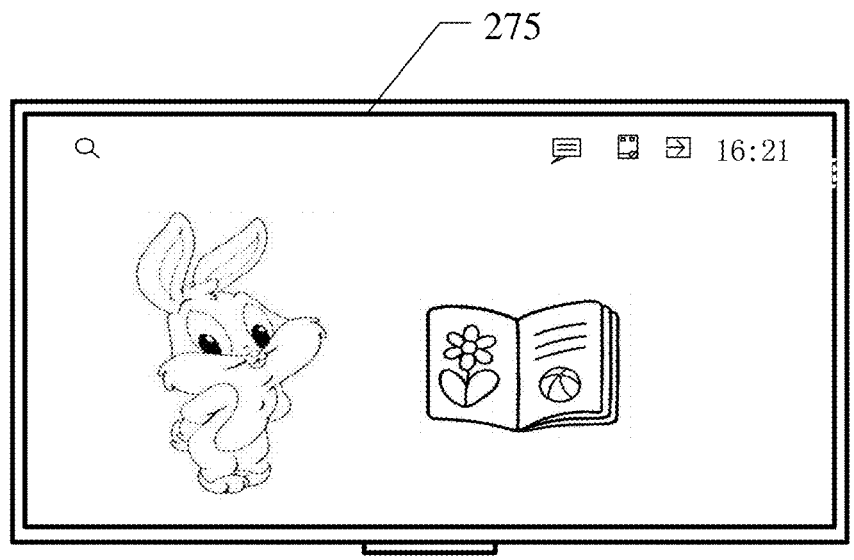
FIG. 5A is a schematic diagram of a landscape mode of a display device in FIG. 1A according to some embodiments of the disclosure.

The power supply 290 is configured to provide power supply support for the display device 200 through power input from an external power supply under the control of the controller 250. The power supply 290 may be a built-in power circuit installed in the display device 200, and may also be a power supply installed to the outside of the display device 200. Referring to FIG. 5A, it is a schematic diagram of a landscape mode of the display device in FIG. 1B according to some embodiments of the disclosure. An operation mode where the screen 275 is in the landscape state may be referred to as a landscape media resource view mode, and an operation mode where the screen 275 is in a portrait state may be referred to as a portrait media resource view mode. In FIG. 5, it can be seen that the screen 275 in the display device 200, the controller 250 in the display device 200 is further in communication connection with the server 300, and is configured to call a port of the server 300 to acquire data. The screen 275 in the display device 200 can be driven by the rotating component 276 to rotate, and is configured to display a user interface. In practical applications, a user may control a play mode, play contents and the like of the display device 200 through the control apparatus 100, where the play mode includes the landscape media resource view mode and the portrait media resource view mode.

In an implementation, the display device 200 includes the rotating component 276. The rotating component 276 can fix the display device 200 and control the screen 275 to rotate under the control of the controller 250 to make the screen 275 in the landscape mode or the portrait mode. The rotating component 276 may be fixed at the back of the screen 275, is configured to be fixed to a wall, and receives control instructions from the controller 250 to make the screen 275 rotate in a vertical plane so as to be in the landscape mode or the portrait mode.

The landscape mode refers to a state where a length (width) of the screen 275 in a horizontal direction is greater than a length (height) in a vertical direction when the screen 275 is viewed from the front. The portrait mode refers to a state where the length (width) of the screen 275 in the horizontal direction is smaller than the length (height) in the vertical direction when the screen 275 is viewed from the front. Apparently, the vertical direction in the disclosure means being substantially vertical, and the horizontal direction also means being substantially horizontal.

Figure 5B:
FIG. 5B is a schematic diagram of a portrait mode of a display device in FIG. 1 according to some embodiments of the disclosure.

Under driving of the rotating component 276, the screen 275 may rotate clockwise or anticlockwise by 90 degrees so as to be in the portrait mode, as shown in FIG. 5B. In the portrait mode, the display may display a user interface corresponding to the portrait mode, and has an interface layout and an interaction way corresponding to the portrait mode. In the portrait media resource view mode, a user may view portrait media resources such as short videos and comics. Similarly, since the controller 250 in the display device 200 is further in communication connection with the server 300, in the portrait mode, media resource data corresponding to a portrait screen may be acquired by calling the server 300.

The portrait mode is more suitable for playing portrait-form media resources with an aspect ratio of 9:16, for example, short videos and the like made by terminals such as a mobile phone. Due to the fact that the terminals such as the mobile phone mostly adopt vertical screen ratios such as 9:16 and 9:18, when the terminals are connected to the display device 200 and the display device 200 is used to display terminal images, the portrait mode can avoid excessive scaling of the images, the display image of the screen 275 is fully utilized, which allows for better user experience.

It should be noted that the landscape mode is mainly used to display horizontal media resources such as dramas and films, and the portrait mode is mainly used to display vertical media resources such as short videos and comics. The landscape mode and the portrait mode are only two different states of the screen, and do not limit displayed contents. For example, the vertical media resources such as short videos and comics may still be displayed in the landscape mode, and the horizontal media resources such as dramas and films also may still be displayed in the portrait mode, only that an incompatible display window in the states needs to be compressed and adjusted.

The display device 200 may provide a display image for a user through the screen 275, and may provide multiple display layers, such as an image layer and a UI layer. The image layer refers to a display layer for presenting a play image on the display device 200 after the user plays a media resource, and may also be referred to as a Video layer of the display device 200. At the image layer, the play image corresponding to the media resource may be displayed. The UI (user interface) layer refers to a display layer for providing interaction operations for the user, and may also be referred to as an On-Screen Display (OSD) layer of the display device 200. The UI layer may display various interaction controls, such as a homepage.

According to different rotating states of the screen 275, homepage modes presented on the screen 275 are also different. For example, in an implementation, during starting of the display device 200, when it is detected that the screen 275 is currently in the landscape mode, the controller 250 requests to call a port of the server 300 and sends a request for landscape homepage data to the server 300. The server 300 responds to the request and sends the landscape homepage data to the controller 250. The controller 250 identifies the landscape homepage data and controls the screen 275 to display a landscape homepage according to the landscape homepage data.

In an exemplary embodiment of the disclosure, when the screen 275 is in the portrait mode, in response to an operation command, the rotating component 276 is controlled to rotate so as to convert the screen 275 from the current portrait mode to the landscape mode, and the port of the server 300 is invoked, and a request for the landscape homepage data is sent to the server 300. The server 300 responds to the request and sends the landscape homepage data to the controller 250. The controller 250 identifies the landscape homepage data and controls the screen 275 to display the landscape homepage according to the landscape homepage data.

To have better view experience, when different media resources are displayed, the landscape mode and the portrait mode of the screen 275 may be adjusted through the rotating component 276, that is, the screen 275 can rotate according to user requirements, the user may send an operation command for triggering rotation to the controller 250, and the controller 250 receives and responds to the operation command for triggering rotation sent from the user, so as to change the rotating state of the screen 275. The rotating state may include the landscape mode or the portrait mode, the landscape mode consists with the landscape media resource view mode, and the portrait mode consists with the portrait media resource view mode.

In an implementation, the controller 250 of the display device 200 may determine whether to rotate the screen 275 by detecting the aspect ratio displayed in the screen 275. For example, the user plays the vertical media resources such as short videos and comics in the landscape mode, and when the controller 250 detects that the vertical media resources do not conform to the current landscape mode, the rotating component 276 is automatically controlled to rotate the screen 275 90 degrees to adjust the screen to the portrait mode.

Since the rotating component 276 is slow in the rotating process, in the rotating process, the user needs to view an inclined image for a relatively long time. For example, the screen 275 needs to rotate clockwise 90 degrees from the landscape mode to the portrait mode, the rotating process may take up to 15 seconds, then within 15 seconds, an image in the screen 275 will incline continuously along with rotation of the screen 275 until the screen 275 rotates to the portrait mode, and then the image is rotated anticlockwise 90 degrees to be displayed in a portrait way.

In order to reduce inclination time and improve user experience, the disclosure may synchronously rotate the display image at the image layer, so as to make the display image on the screen 275 in an upright direction all the time in the rotating process. The image layer is a display layer in an operating system corresponding to the display device 200. Different from the UI layer, the image layer may conveniently adjust the image quality, scaling ratio and direction of images. Generally, playing images corresponding to media resources are displayed at the image layer, therefore, the source of video resources may be not considered in synchronous rotation at the image layer, and all media resources can be adjusted.

When the user plays media resources incompatible to the current rotating state, the screen 275 needs to be rotated to adapt to incompatible media resource images, and specific processing is as follows.

First, a video is selected to be played. The user may play the video through a series of operations on the UI according to his or her own requirements. For example, the user may operate on the control apparatus 100, and selects "selection"-"my applications"-"short videos" on a homepage to enter a short video application interface. In the application interface corresponding to short videos, a video is randomly selected to be played. Apparently, in the disclosure, video resources include video resources from the local memory, push resources according to digital living network alliance (DLNA), and sharing of a database management system (DMS).

In order to adapt to different displaying, homepages for the user to operate may also include a landscape homepage and a portrait homepage, and different contents may be presented in different homepage modes. For example, in the landscape homepage mode, many horizontal media resources or links of films, dramas and other types may be presented in the homepage for the user to directly select for playing. The vertical media resources may be classified into one or more controls, such as a "short video" application icon, and the user can only select the vertical media resources or links to play after clicking a corresponding control.

Second, the played video is detected. After the user determines the video resource to be opened, the controller 250 decodes the video resource and converts it into a video image to be displayed on the screen 275. While the screen 275 is controlled to display the video image, the controller 250 may also detect the displaying aspect ratio of the image and the state of the screen 275 to determine whether the aspect ratio of the current display image adapts to the current state of the screen 275.

For example, if the current display image is a vertical media resource and the screen 275 is in the portrait mode, the aspect ratio of the current display image adapts to the current state of the screen 275, and the display does not need to be rotated for adjustment. If the current display image is a vertical media resource and the screen 275 is in the landscape mode, the aspect ratio of the current display image does not adapt to the current state of the screen 275, and the display needs to adjust.

Final, rotating adjustment is performed. For the case that rotating adjustment is needed, the controller 250 triggers the rotating component 276 to rotate to adjust the state of the screen 275. Meanwhile, the display image may be rotated for adjustment in an opposite direction at the image layer, so that the display image can be kept in an upright display state all the time in the rotating process of the screen 275.

In some embodiments of the disclosure, when the currently played image is a vertical media resource and the screen 275 is currently in the landscape mode, the controller 250 sends an instruction for controlling the rotating component to rotate on the one hand, so that the rotating component 276 is made to drive the screen 275 to rotate clockwise 90 degrees so as to adjust the state of the screen 275 to the portrait mode. The current display image may be adjusted at the image layer so as to be rotated and/or scaled, so that the current display image is gently rotated anticlockwise 90 degrees. Clockwise rotation of the display image in the rotating process may counteract inclination caused by anticlockwise rotation of the screen 275, so that the display image is kept in the upright display state all the time.

Figure 6:
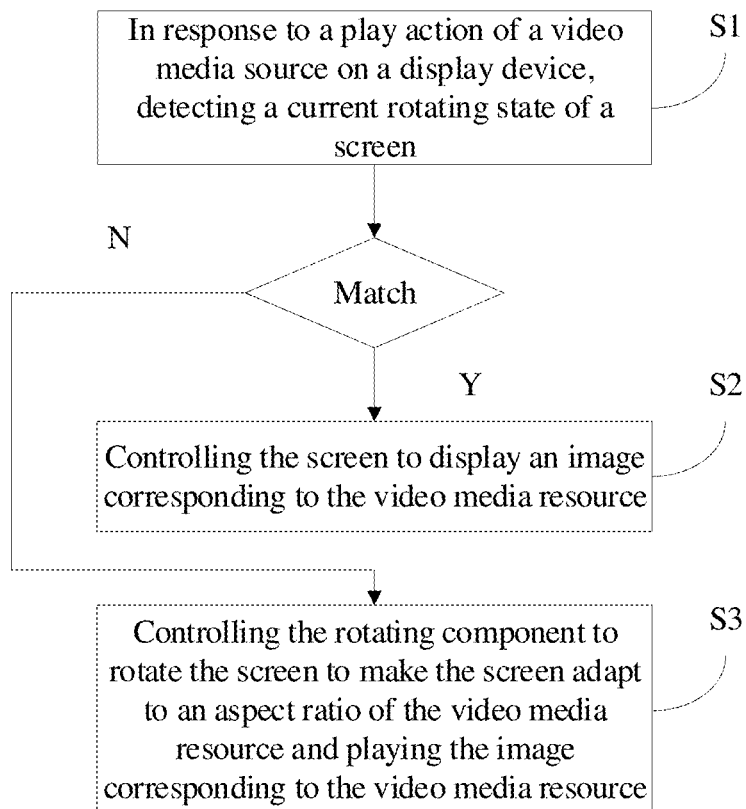
FIG. 6 is a schematic flowchart of an image display method according to some embodiments of the disclosure.

FIG. 6 illustrates a schematic flowchart of a display image adapting method of the disclosure. In an actual control process, a controller 250 in the disclosure is further configured to execute the following steps.

S1: in response to a video media source play action on a display device, detecting a current rotating state of a screen.

A user selects a media resource on a homepage and plays the resource, so the video media resource play action is produced in the display device 200. For example, after the user launches a short video application through "selection-my applications-short videos", one of a plurality of short video resource icons is selected for play.

After the controller 250 monitors the video media resource play action, the current rotating state of the screen 275 may be determined through an angle sensor on a rotating component 276 or a gravity acceleration sensor on the screen 275. For example, from analysis of data measured by the gravity acceleration sensor, it may be determined that a gravitational direction of the screen 275 is perpendicular to a long edge, and then it is determined that the screen 275 is currently in a landscape mode.

S2: controlling the screen to display an image corresponding to the video media resource in response to an aspect ratio of the video media resource being matched with the current rotating state.

The controller 250 may determine a display aspect ratio corresponding to the video media resource in file description information of the video media resource. For example, if the played video media resource is a short video and its display aspect ratio is 9:16, the current short video is a vertical media resource. If the rotating state of the screen 275 is also a portrait mode at this moment, the aspect ratio of the video media resource is matched with the current rotating state, and in this situation, the screen is directly controlled to display the image corresponding to the vide media resource.

S3: controlling the rotating component to rotate the screen to make the screen adapt to an aspect ratio of the video media resource and playing the image corresponding to the video media resource in response to the aspect ratio of the video media resource being not matched with the current rotating state of the screen.

In some exemplary embodiments of the disclosure, if the current rotating state of the screen 275 is the landscape mode, and the played video media resource is a vertical media resource such as a short video, it is determined that the aspect ratio of the video media resource is not matched with the current rotating state, and in this case, the rotating component 276 may be controlled to rotate the screen 275 to the portrait mode so as to adapt to the display aspect ratio corresponding to the played short video.

It is noted that in the embodiments according to the disclosure, whether the aspect ratio and the rotating state are matched means that: whether the aspect ratio of the played video media resource is the same as or has a similar ratio relationship with the aspect ratio of the screen 275. For example, for traditional horizontal media resources such as films and dramas, widths of their images are greater than heights, namely, the aspect ratio of the horizontal media resources is usually greater than 1. When the screen 275 is in the landscape mode, a long side is in a horizontal state and serves as a width side, a short side is in a vertical state and serves as a height side, and the aspect ratio of the screen 275 in the landscape mode is also greater than 1. Similarly, for vertical media resources such as short videos and comics, widths of their images are smaller than heights, namely, the aspect ratio of the vertical media resources is smaller than 1. When the screen 275 is in the portrait mode, the long side is in a vertical state and serves as a height side, the short side is in a horizontal state and serves as a width side, and the aspect ratio of the screen 275 in the portrait mode is also smaller than 1.

In the disclosure, if image aspect ratio of the video media resources and the aspect ratio of the screen 275 are both greater than 1 or smaller than 1, it is determined that the aspect ratio of the video media resource is matched with the current rotating state. That is, the aspect ratio of the horizontal media resources is matched with the landscape mode, and the aspect ratio of the vertical media resources is matched with the portrait mode. Similarly, if image aspect ratio of the video media resources and the aspect ratio of the screen 275 are not both greater than 1 or smaller than 1, it is determined that the aspect ratio of the video media resource is not matched with the current rotating state. That is, the aspect ratio of the vertical media resources is not matched with the landscape mode, and the aspect ratio of the horizontal media resources is not matched with the portrait mode.

In order to obtain the aspect ratio of a display image, the controller 250 may obtain the aspect ratio from description information of a resource after the user selects a certain resource to play. For most resources, their file descriptions will specify their aspect ratios. For example, if file description information is 4096×2160, it is determined that its aspect ratio is 4096:2160>1. The aspect ratio of the display image may also be determined by inquiring effective pixel points occupied by a display image in width and height. For example, except pixel points occupied by black inserting regions, the effective pixel points occupied by the display image in width and height are respectively 720 and 1280, and then its aspect ratio is 720:1280<1.

Figure 7:
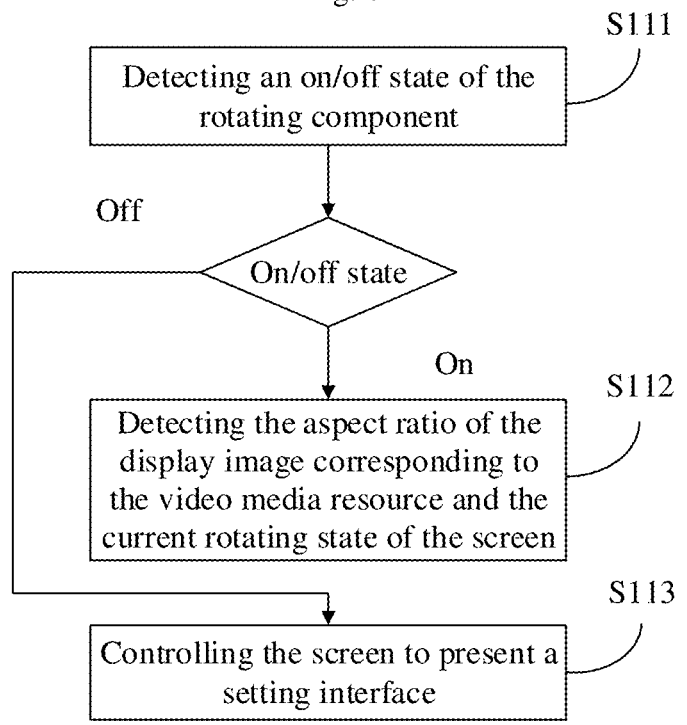
FIG. 7 is a schematic flowchart of detecting an on-off state according to some embodiments of the disclosure.

In an implementation, as shown in FIG. 7, the controller 250 is further configured to execute the following steps.

S111: detecting an on/off state of the rotating component.

After a video resource is selected for play, the controller 250 may detect a rotating switch of the display device 200 to determine whether the rotating component 276 is in an on state. Apparently, the on/off state of the rotating component 276 may refer to an on/off state in hardware, that is, whether a control circuit of the rotating component 276 is powered on; and may also refer to an on/off state in software, that is, in an operating system, whether a control application corresponding to the rotating component 276 is in an active state or not.

S112: detecting an aspect ratio of a display window corresponding to the video media resource and the current rotating state of the screen in response to the state of the rotating component being on.

If the state of the rotating component 276 is on, the rotating component 276 at present may be controlled by the system to start running at any time. In this situation, the controller 250 may further detect the aspect ratio of the display image corresponding to the current video media resource and the current rotating state of the screen, so that whether the screen 275 and the display image need to be rotated is determined according to detection results.

The aspect ratio of the display image refers to a ratio of a width to a height at edges of the display image. It is noted that the edge of the display image herein refers to an edge of an effective display image, such as an edge of a video or an edge of an image, not including black regions which fill for adaption. For example, the current display image is a vertical media resource, its image width is 360 pixels, its image height is 640 pixels, and the corresponding aspect ratio is 360:640. The screen 275 is in a landscape mode currently, a display resolution is 3840×2160, namely the aspect ratio of a display region of a screen is 3840:2160, and it is determined that the aspect ratio of the current display image is inconsistent with the current rotating state of the display.

Since video resources have great differences in aspect ratio, in order to adapt to various resource types, aspect ratios of display images may be classified according to specific ratios. If the aspect ratio of a display image is greater than 1, namely the width of the image is greater than the height, the video resource is a horizontal media resource. Similarly, if the aspect ratio of a display image is smaller than 1, namely the width of the image is smaller than the height, the video resource is a vertical media resource.

Accordingly, whether the aspect ratio of the current display image adapts to the current rotating state of the screen may be determined by determining the aspect ratio of the display image. If the aspect ratio is greater than 1, the video is considered as a wide video, in this case, if the screen 275 is in the landscape mode, the screen 275 does not need to be driven to rotate, and if the screen 275 is in the portrait mode, the screen 275 needs to be rotated to a landscape screen. If the aspect ratio is smaller than 1, the video is considered as a high video, if the screen 275 is in the landscape mode, the screen 275 needs to be rotated, and if the screen 275 is in the portrait mode, the screen 275 does not need to be driven to rotate.

In some exemplary embodiments of the disclosure, after detecting the on/off state of the rotating component, the controller 250 is further configured to execute the following steps.

S113: control the screen to present a setting interface of the on/off state of the rotating component in response to the state of the rotating component being off.

When it is determined that the on/off state of the rotating component 276 is off, the rotating component 276 cannot be directly controlled to complete a rotation operation, and thus the user needs to be notified to turn on a switch of the rotating component 276. For example, the setting interface is displayed on the screen 275, namely a UI corresponding to "setting", for the user to turn on the rotating component 276.

Whether the display aspect ratio is matched with the rotating state of the screen may also be determined by determining an application started on the display device 200. Usually, applications installed on the display device 200 may include three types: first, applications only supporting the landscape mode, e.g., film and drama apps, and if this type of applications is launched in the portrait mode, the screen 275 is controlled to rotate to the landscape mode; second, applications only support the portrait mode, e.g., short video apps such as Kwai and Tik Tok, and if this type of applications is opened in the landscape mode, the screen 275 is controlled to rotate to the portrait mode; and third, applications support both the landscape mode and the portrait mode, e.g., apps such as application stores, Facetime and games, the screen 275 does not need to be rotated when this type of applications is launched, but a display layout of an application interface needs to be adjusted according to the rotating state of the screen 275.

Figure 8:
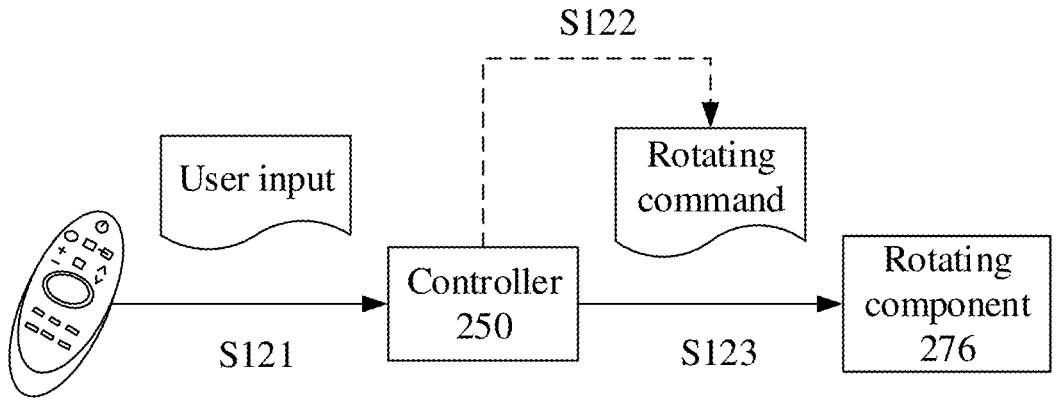
FIG. 8 is a schematic flowchart of inputting a rotating instruction according to some embodiments of the disclosure.

In an implementation, as shown in FIG. 8, the controller 250 is further configured to execute the following steps.

S121: receiving a command for rotating the screen from a user.

The command refers to an instruction for triggering a rotating operation, may be actively initiated by the user and may also be automatically initiated by the controller 250 by judging a current display state. It is noted that a rotating command is intended to trigger the rotating operation, in practical applications, a corresponding user command may not exist, for example, when the controller 250 judges that the currently played image is a vertical media resource and the screen 275 is in the landscape mode currently, the rotating operation may be automatically triggered without additionally receiving a rotating instruction. Therefore, for those skilled in the art, as long as the rotating operation is triggered, it falls within the protection scope of the disclosure.

The user may implement different operations through the control apparatus 100 to generate a command for triggering the rotating component 276 to rotate. The operations performed by the user may be directly displayed on a UI in the form of controls, and may also be displayed dynamically on the UI. That is, the controller 250 may adjust control display conditions on the UI in real time by detecting the aspect ratio of a played video and the current rotating state of the screen 275.

For example, when the user selects one video resource in a "short video" application to play, the controller 250 detects that the played video is a vertical media resource according to its aspect ratio, which is not consistent with the current landscape mode of the screen 275, and the following prompt text and control, for example, are displayed in the UI: the current video resource is more suitable for being viewed on a portrait screen, whether to automatically switch to a portrait mode or not; yes/no. When the user selects "yes", a corresponding user input is generated, and the user input is sent to the controller 250. In another example, there may be no prompt text or option controls presented on the UI of the display device. When a user selects a vertical media resource, such as a short video, no rotating command is generated from a user, instead the display device is able to rotate the screen automatically to allow the selected media source play in a suitable screen state.

S122: sending the command to a driving motor of the rotating component to start rotating.

For the command sent from the user, the controller 250 needs to parse an input of the user to determine a rotating strategy of the screen 275. For example, when the user wants to adjust the screen 275 from the landscape mode to the portrait mode, the command for rotating may control the rotating component 276 to rotate clockwise 90 degrees. When the users wants to adjust the screen 275 from the portrait mode to the landscape mode, the command may control the rotating component 276 to rotate anticlockwise 90 degrees.

In an implementation, if the aspect ratio of the video media resource is not matched with the current rotating state, the controller 250 is further configured to execute the following step.

S31: calculating a rotating parameter according to the current rotating state and the aspect ratio of the video media resource.

The controller 250 may determine to control the screen 275 to rotate according to the current rotating state and the aspect ratio of the video media resource. For example, when the current rotating state of the screen 275 is the landscape mode and the aspect ratio of the video media resource is vertical, an instruction of rotating the screen 275 to the portrait mode, namely rotating the screen 275 clockwise 90 degrees may be specified.

S32: adjusting a display window of the video media resource on the screen according to the rotating parameter.

In order to achieve better view experience while rotating the screen 275, the controller 250 may make the displayed image to rotate synchronously with the screen 275, so as to keep the display image in an upright state all the time, and thus the rotating parameter includes a display image scaling ratio and/or a rotating angle. The controller 250 needs to adjust the display image, for example, in the process that the screen 275 is rotated clockwise 90 degrees, the display image is controlled to rotate anticlockwise 90 degrees, and the screen 275 and the display image are kept synchronous in the rotating process so as to achieve the purpose of displaying the image uprightly all the time.

In the disclosure, the display image is adjusted at an image layer, namely only a video play image is adjusted, so that the flexibility and efficiency of adjustment will be greatly improved. Adjustment of the display image on the image layer is not limited to sources of played video resource files, and video files in a local magnetic disk, video files pushed by a DLNA device to the display device 200 and video files shared by a DNS can all be adjusted. In addition, adjustment on the image layer may also adjust the display image further on the basis of not affecting a UI layer image.

For example, the controller 250 may also adjust the display image more finely, including the rotating operation, a scaling operation, etc. The rotating operation is adjustment performed for adapting to rotation of the screen 275, and the scaling operation is adjustment performed for adapting to width-height change of the screen 275 in the rotating process. In practical applications, the rotating operation and the scaling operation may be performed synchronously, or the rotating operation may be performed prior to the scaling operation.

Figure 9:
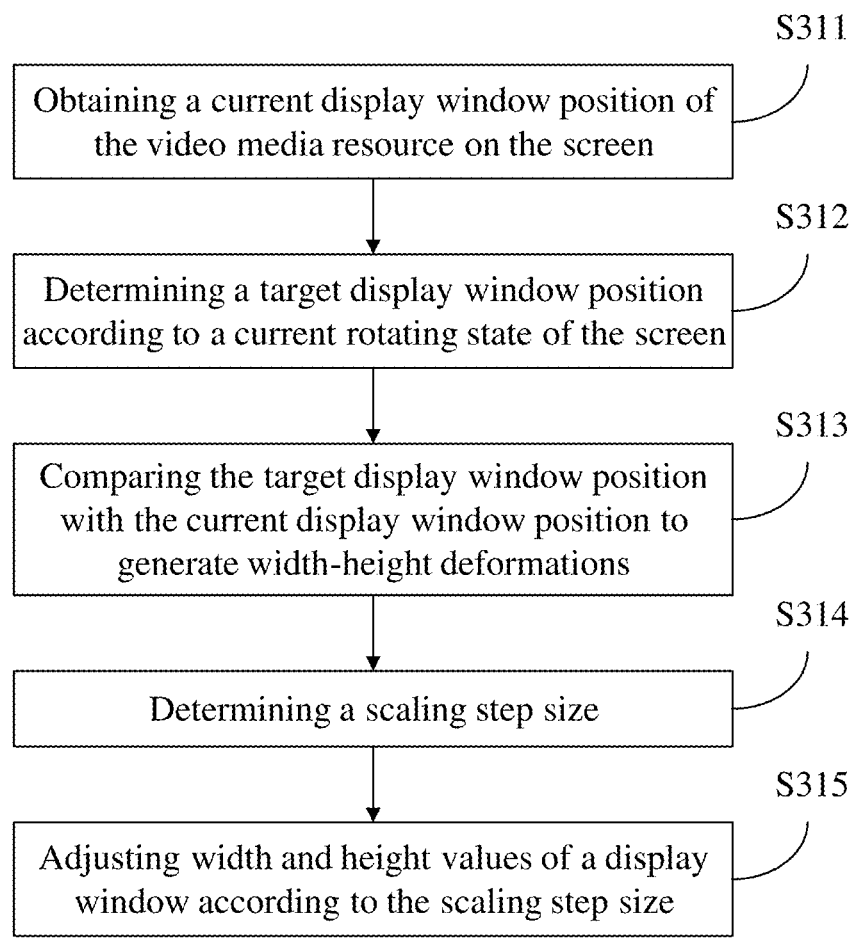
FIG. 9 is a schematic flowchart of a display image scaling operation according to some embodiments of the disclosure.

In an implementation, as shown in FIG. 9, for the scaling operation of the display image, the controller 250 is further configured to execute the following steps.

S311: obtaining a current display window position of the video media resource on the screen.

S312: determining a target display window position according to a current rotating state of the screen.

S313: comparing the target display window position with the current display window position to generate width-height deformations.

S314: determining a scaling step size, where the scaling step size is a width-height scaling increment per unit time obtained through calculation according to the width-height deformations and a rotating speed of the rotating component.

S315: adjusting width and height values of the display window according to the scaling step size.

In the embodiments of the disclosure, the current display window position and the target display window position refer to image display window positions corresponding to the rotating states of the screen 275 before and after rotation of the screen 275. For example, in the process that the screen 275 is rotated from the landscape mode to the portrait mode, a played video image display position of the image layer corresponding to the landscape mode is a current display window position, and a played video image display position of the image layer corresponding to the portrait mode of the rotated screen 275 is a target display window position. Similarly, in the process that the screen 275 is rotated from the portrait mode to the landscape mode, a played video image display position of the image layer corresponding to the portrait mode is a current display window position, and a played video image display position of the image layer corresponding to the landscape mode of the rotated screen 275 is a target display window position.

In the present embodiments, in order to fill display regions of the screen 275 as much as possible with the display image in the rotating process of the screen 275 and guarantee a good display quality, the display image may be processed with equal proportion scaling while the display image is being rotated.

Specifically, after a media resource image is played, the target display window position may be determined according to the rotating angle and a screen dimension characteristics of the screen 275. For example, when the landscape mode needs to be switched to the portrait mode, a rotating angle is 90 degree clockwise, so that a position corresponding to a play region in the portrait mode is determined as a predetermined target window position.

After the target display window position is determined, the width-height deformations of the display window may be determined by comparing the target display window position with the current display window position. For example, a 65-inch screen is 1440:810, when a vertical media resource is displayed in the landscape mode, the height of the display image is smaller than or equal to the height of the screen 275, namely being smaller than or equal to 810 mm, and it may be smaller than or equal to the height of 1440 mm (the width of the display in the landscape mode) when the vertical media resource is displayed in the portrait mode, so that it may be determined that the height deformation of the display image is 1440-810=630 mm. Similarly, the width deformation may be figured out according to the aspect ratio of the vertical media resource.

After the width-height deformations are determined, the width-height scaling increment per unit time may be obtained through calculation according to the width-height deformations and the rotating speed of the rotating component 276, namely the scaling step size is determined. For example, if the screen 275 needs to be rotated from the landscape mode to the portrait mode in 15 s, the height scaling step is 630/15=42 mm/s. Similarly, the width scaling step may also be figured out according to the width deformation.

After the scaling step in height and width of the display image are determined separately, the width and height values of the display image window may be adjusted at the same time according to the scaling step lengths. Therefore, when the screen 275 is rotated to the target state, the display image fits the display region of the screen 275, so that user experience is improved.

In order to achieve better display effect, in the step that the width and height values of the display image window are adjusted at the same time according to the scaling step size, the controller 250 may be further configured to execute the following steps: a coordinate of a scaling base point is determined in the current display window; and the width and height values of the display image window are adjusted synchronously according to the scaling step size with the coordinate of the scaling base point as a reference.

The scaling base point may be determined according to the shape and an adjusting way of the display window. For example, a center point of the display window may be selected as the scaling base point. In this way, the position of the base point is stationary before and after the display image is rotated. One of the four corner points of the window may also be used as the scaling base point, e.g., the upper left corner point.

Figure 10:
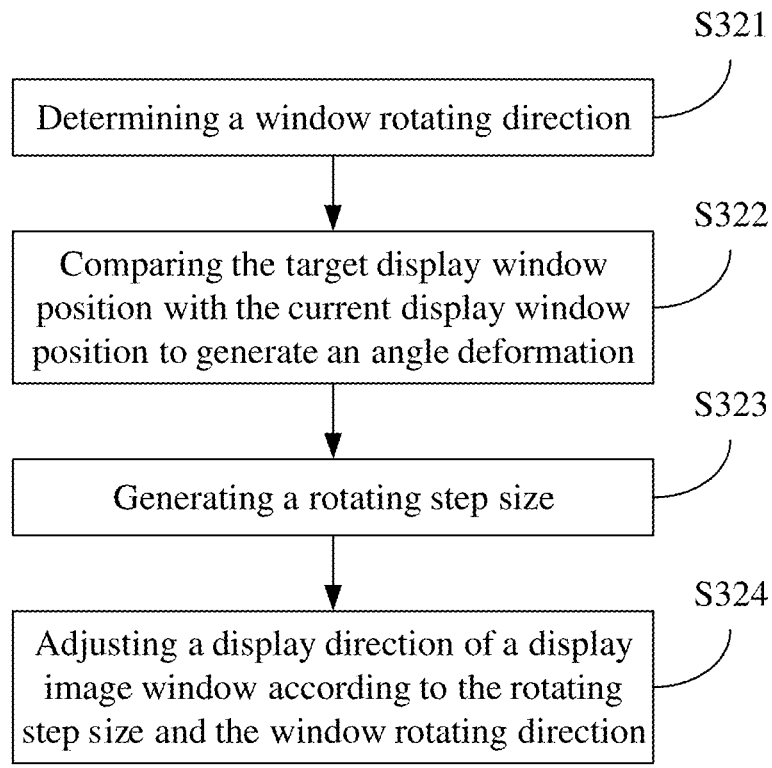
FIG. 10 is a schematic flowchart of a display image rotating operation according to some embodiments of the disclosure.

In an implementation, as shown in FIG. 10, for the rotating operation of the display image, the controller 250 is further configured to perform the following steps.

S321: determining a window rotating direction.

The rotating direction of the display image may be determined according to a rotating direction of the screen 275, wherein the window rotating direction is opposite to the rotating direction of the screen. For example, when the screen 275 needs to be rotated 90 degrees clockwise so as to be switched from the landscape mode to the portrait mode, a corresponding window rotating direction is anticlockwise rotation.

S322: comparing the target display window position with the current display window position to generate an angle deformation.

After the rotating direction is determined, the angle deformation may be generated according to the target display window position and the current display window position. For example, when the target display window position is the display position in the portrait mode and the current display window position is the display position in the landscape mode, the angle deformation is 90 degrees.

S323: generating a rotating step size.

After the angle deformation is generated, the rotating step size is calculated as well according to the rotating speed of the screen 275. The rotating step size is an angle rotating increment per unit time calculated according to the angle deformation and a rotating speed of the rotating component. For example, the rotating process from the landscape mode to the portrait mode takes 15 s, and then the rotating step is 90/15=6 degrees/s, that is, in the rotating process, the display image is rotated 6 degrees per second to make the screen 275 and the display image keep synchronous rotation.

S324: adjusting a display direction of the display image window according to the rotating step size and the window rotating direction.

After the rotating step size is calculated, the display direction of the display image window may be adjusted according to the rotating step size and the window rotating direction. For example, the screen 275 is rotated clockwise 6 degrees per second, and the display image is rotated anticlockwise 6 degrees, so that the display image is always kept in an upright state.

It should be noted that in order to adapt to various different video resources, the state of the screen 275 may not be limited to the landscape mode and the portrait mode, and the display may also be kept in multiple inclined states according to play requirements. Therefore, the current display window position and the target display window position are not limited to the above two conditions, and may also be rotating processes for any two different angles.

In the above embodiments, the rotating operation of the display image may be controlled according to the speed of rotation of the screen 275 driven by the rotating component 276. Since the rotating speed of the rotating component 276 is determined by a drive motor and may be kept unchanged after one display device 200 is initially debugged, for all rotating processes, the rotating parameter may be determined through the stationary rotating speed. Therefore, the above process of calculating the rotating parameter is the simplest, and convenient to control the rotating operation.

Figure 11:
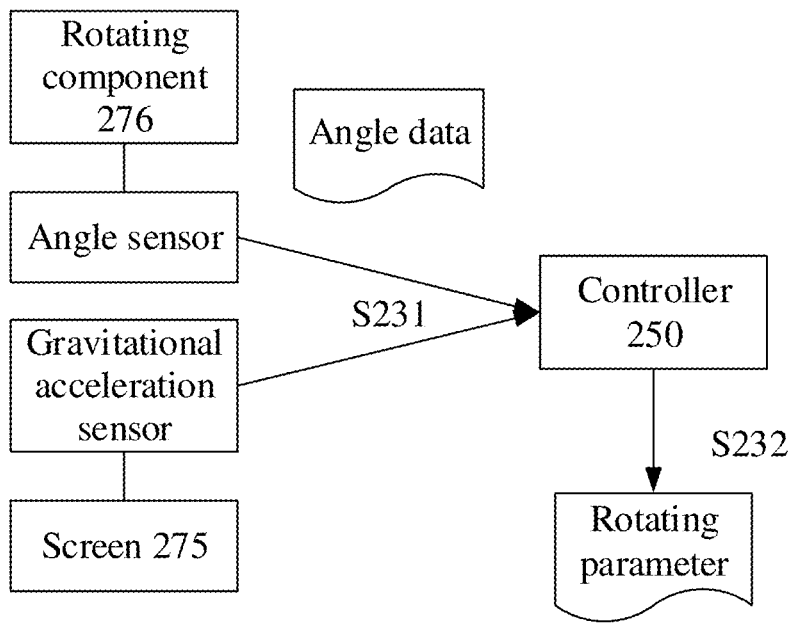
FIG. 11 is a schematic flowchart of calculating a rotating parameter according to some embodiments of the disclosure.

However, in some cases, for example, when the rotating component 276 has accumulative errors along with the extension of use time, the rotating speed of the rotating component 276 will be changed, in order to adapt to the change of the rotating speed, in an implementation, the rotating component 276 has an angle callback interface, and the angle callback interface may detect the angle which the rotating component 276 is rotated in real time through an angle sensor, so as to determine a posture corresponding to any moment in the rotating process of the screen 275. By disposing a gravitational acceleration sensor on the screen 275, the posture corresponding to any moment of the screen 275 may also be obtained in the rotating process of the screen 275 by detecting information of the gravitational acceleration sensor in three directions of a space coordinate system (x, y, z). Then the display image is adjusted in real time according to detection data, that is, as shown in FIG. 11, the controller is further configured to perform the following steps.

S231: monitoring the angle sensor and/or the gravitational acceleration sensor of the rotating component to obtain angle data of the screen in real time.

S232: synchronously calculating a rotating parameter of a display window according to the angle data.

Figure 12:
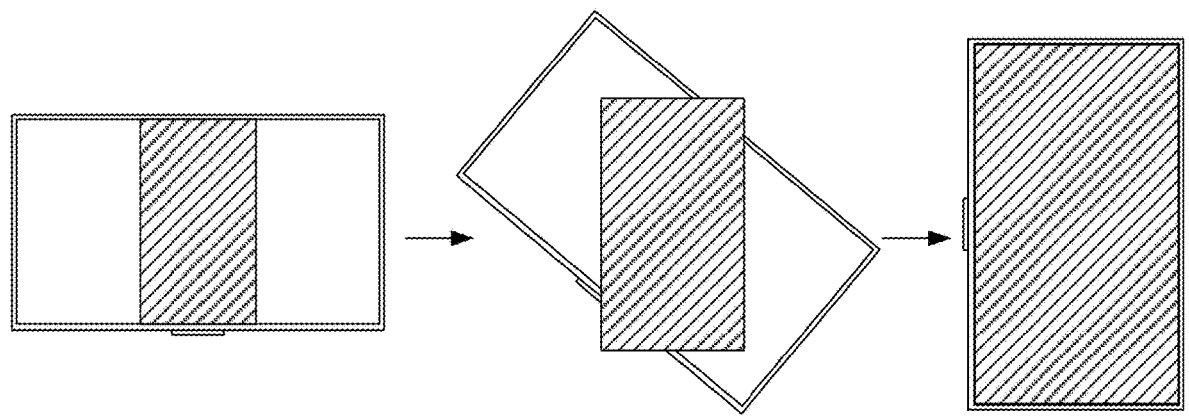
FIG. 12 is a schematic diagram of an image display method according to some embodiments of the disclosure.

In practical applications, as shown in FIG. 12, the controller 250 may initiate an Orientation Event Listener application to obtain the rotating angle of the screen 275 by monitoring an angle callback interface of the Android standard in the process of controlling the screen 275 to rotate, so that the position of the target window and a rotating angle required are calculated in real time to cause the rotation of the target window along with rotation of the screen 275.

In the above embodiments, the angle callback interface is not limited to the angle callback interface of the Android standard, and in practical applications, other corresponding angle callback interfaces may be called according to the operating system of the display device 200. The angle callback interface may also be an angle callback interface generated by the controller 250 according to a set rule and x, y, z direction information of sensors such as the gravitational acceleration sensor.

Exemplarily, the step that the position of the target window and the rotating angle required are calculated in real time is as follows.

Figure 13:
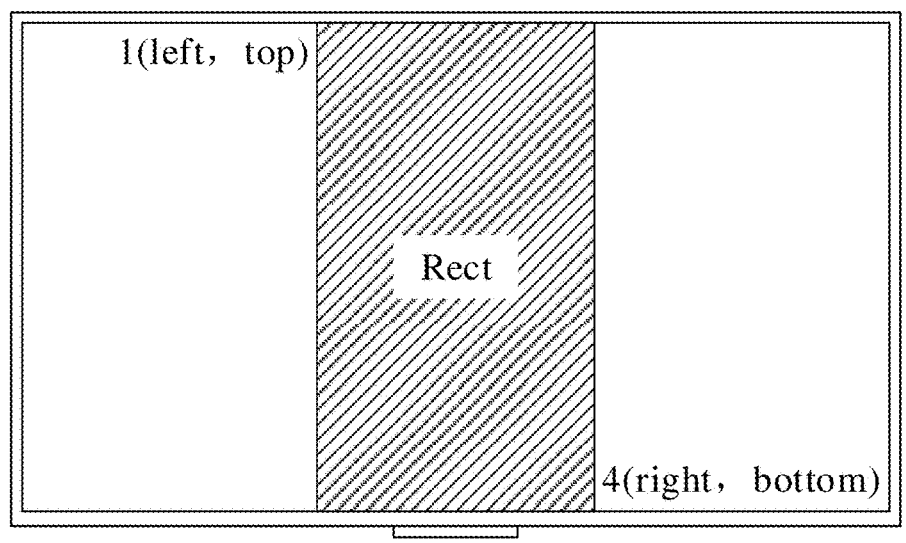
FIG. 13 is a schematic diagram of a display image according to some embodiments of the disclosure.

As shown in FIG. 13, a video display region Rect is a rectangular region including four points, and the coordinates of each point are the coordinates of the point on a screen. With the upper left corner point of the screen as an origin, the position of Rect can be determined by specifying point 1 and point 4, wherein point 1 is (left, top) and point 4 is (right, bottom).

Parameters of the image layer Surface View include scaling ratios scale X and scale Y, as well as a rotating angle rotate. Scale X and scale Y may use the positions of right and bottom of Rect, a width and a height of a video window are recorded, a current position oldRect and a target position newRect of the video window are calculated respectively, and the width and the height of the display region are gradually increased according to the principle of equal steps until the target position. A specific algorithm is as follows:

Rect oldRect=newRect(0,0,oldWidth,oldHeight);

Rect newRect=newRect(0,0,newWidth,newHeight);

float defWidth=(newWidth−oldWidth)/90;

float defWidth=(newWidth−oldWidth)/90;

float tempWidth=oldWidth+defWidth×rotate;

float tempHeight=ildHeight+defHeight×rotate;

flocat scale$X$=tempWidth/$m$BaseWidth;

flocat scale$Y$=tempHeight/$m$BaseHeight;

Where mBaseWidth and mBaseHeight are a base width and height, and are configured to calculate scale X and scale Y.

It can be known from the above embodiments that the display device of the disclosure can adjust the video play image at the image layer, so as to automatically rotate the screen 275. In the rotating process of the screen 275, the display image is also rotated in real time, so that the display image may be made to keep the upright state all the time, so as to lower the influence of the television rotating process on viewing experience.

Based on the above display device 200, the disclosure further provides a display image rotation adapting method which is applied to the controller 250 and used to control a rotating process. The method includes following operations:

a current rotating state of a screen of the display device is detected in response to a video media resource play action of the display device;

the screen is controlled to display an image corresponding to a video media resource if an aspect ratio of the video media resource is matched with the current rotating state; and if the aspect ratio of the video media resource is not matched with the current rotating state, a rotating component is controlled to rotate the screen so as to make the screen adapt to the aspect ratio of the video media resource and play the image corresponding to the video media resource.

It is known from the above embodiments that the disclosure provides the display device and the display image rotation adapting method, and in practical applications, the current rotating state of the screen may be detected in response to the video media resource play action of the display device. The rotating component is controlled to rotate the screen so as to make the screen adapt to the aspect ratio of the video media resource and play the image corresponding to the video media resource if the aspect ratio of the video media resource is not matched with the current rotating state. The display device automatically drives a motor of a television to rotate when detecting that a width and a height of a video which is currently played do not match with the current rotating state of the display, and in the rotating process, the image on the screen is synchronously scaled and rotated, so as to avoid a user watching an inclined video image for a relatively long time, so that user experience is improved.

Figure 14:
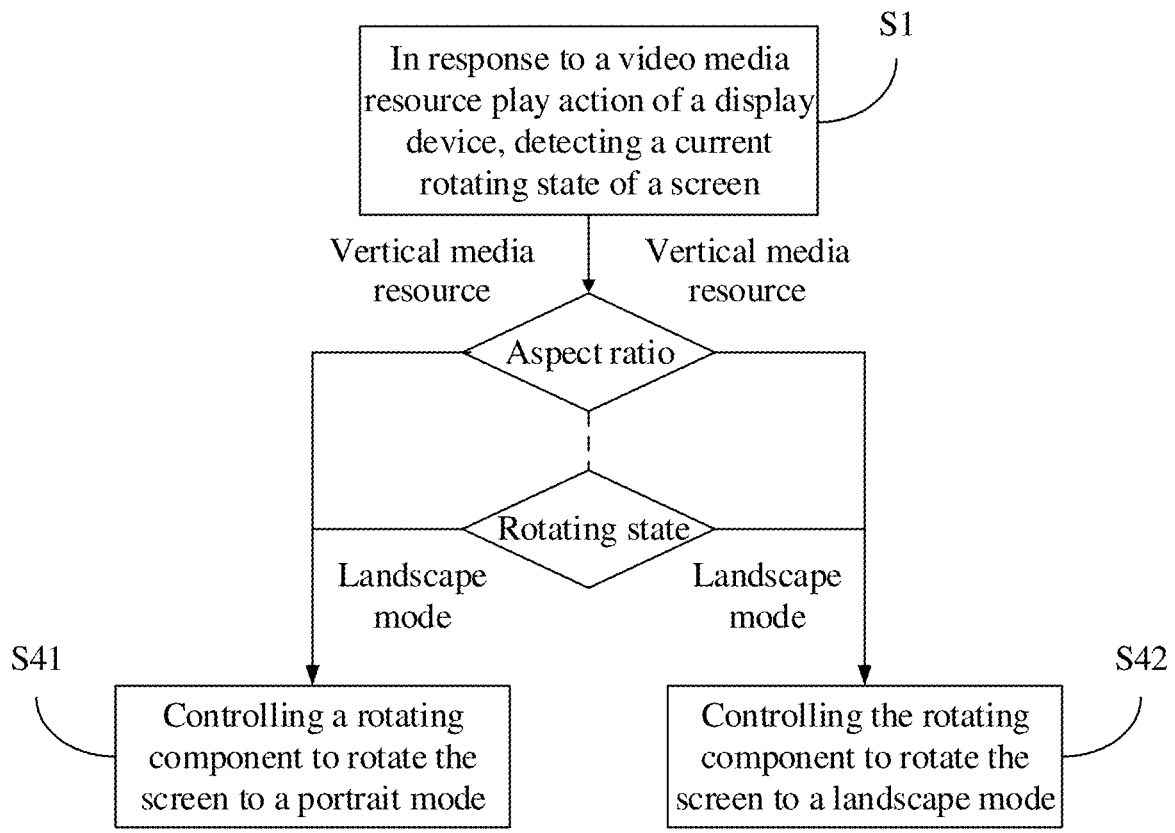
FIG. 14 is a schematic flowchart of an image display method according to some embodiments of the disclosure.

In an implementation, as shown in FIG. 14, the disclosure further provides a display device 200, including a screen, a rotating component and a controller.

The rotating component is connected with the screen and configured to drive the screen to rotate to make the screen in a landscape mode or a portrait mode.

The controller is connected with the rotating component and the screen and configured to: detect a current rotating state of the screen in response to a video media resource play action of the display device; and control the rotating component to rotate the screen into a portrait mode if a video media resource is a vertical media resource and the current rotating state of the screen is the landscape mode.

In an implementation, as shown in FIG. 14, the disclosure further provides a display device 200, including a screen, a rotating component and a controller.

The rotating component is connected with the screen and configured to drive the screen to rotate to make the screen in a landscape mode or a portrait mode.

The controller is connected with the rotating component and the screen and configured to: detect a current rotating state of the screen in response to a video media resource play action of the display device; and control the rotating component to rotate the screen into the landscape mode if a video media resource is a horizontal media resource and the current rotating state of the screen is the portrait mode.

It can be known from the above embodiments that the disclosure provides the display device 200 and the display image rotation adapting method, and in practical applications, the current rotating state of the screen 275 may be detected in response to the video media resource play action of the display device 200. The rotating component 276 may be controlled to rotate the screen 275 into the portrait mode if the video media resource is the vertical media resource and the current rotating state of the screen 275 is the landscape mode; or, the rotating component 276 may be controlled to rotate the screen 275 into the landscape mode if the video media resource is the horizontal media resource and the current rotating state of the screen 275 is the portrait mode. The screen 275 automatically rotates to adapt to an aspect ratio corresponding to the video media resource.

In specific implementations, the present disclosure further provides a non-transitory computer storage medium. The computer storage medium may store programs, and when executed, the programs may cause a processor to perform part or all of the steps in various embodiments of the display image rotation adapting method of the present disclosure. The storage medium may be a magnetic disc, an optical disc, a read-only memory (ROM) or a random access memory (RAM).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A display device, comprising:
   a screen, configured to display broadcast content and/or network content;
   a rotating component, connected with the screen and configured to drive the screen to rotate to make the screen in a landscape mode or a portrait mode; and
   a controller, connected with the rotating component and the screen, and configured to:
   in response to a play action of a video media resource of the display device, detect a current rotating state of the screen;
   in response to the current rotating state of the screen being in the landscape mode and the video media resource being a vertical media resource, control the rotating component to rotate the screen to the portrait mode;
   calculate a rotating parameter according to the current rotating state and an aspect ratio of the video media resource, wherein the rotating parameter comprises a display image scaling ratio and/or a rotating angle;
   adjust a display window of the video media resource on the screen according to the rotating parameter;
   obtain a current display window position of the video media resource on the screen;
   determine a target display window position according to a current rotating state of the screen;
   compare the target display window position with the current display window position to generate width-height deformations;
   determine a scaling step size, wherein the scaling step size is a width-height scaling increment per unit time calculated according to the width-height deformations and a rotating speed of the rotating component; and
   adjust width and height values of the display window according to the scaling step size.

2. The display device according to claim 1, wherein the controller is further configured to:
   determine a coordinate of a scaling base point in the current display window; and
   adjust synchronously the width and height values of the display window according to the scaling step size with the coordinate of the scaling base point as a reference.

3. The display device according to claim 1, wherein the controller is further configured to:
   determine a window rotating direction, wherein the window rotating direction is opposite to a rotating direction of the screen;
   compare the target display window position with the current display window position to generate an angle deformation; and
   generate a rotating step size, wherein the rotating step size is an angle rotating increment per unit time calculated according to the angle deformation and a rotating speed of the rotating component.

4. The display device according to claim 1, wherein the rotating component comprises an angle sensor, and the controller is further configured to:

obtain angle data of the screen in real time by monitoring the angle sensor;

synchronously calculate a rotating parameter of a display window according to the angle data; and adjust a window for displaying the video media resource according to the rotating parameter.

5. The display device according to claim 1, wherein the controller is further configured to:

detect an on/off state of the rotating component;

detect an aspect ratio of a display window corresponding to the video media resource and the current rotating state of the screen in response to the state of the rotating component being on; and control the screen to present a setting interface of the on/off state of the rotating component in response to the state of the rotating component being off.

6. The display device according to claim 1, wherein the controller is further configured to:

receive a command for rotating the screen from a user; and send the command to a driving motor of the rotating component to start rotating.

7. The display device according to claim 1, wherein the rotating component comprises a driving motor and a rotating shaft, wherein the driving motor is connected to the controller, and one end of the rotating shaft is connected to a power output of the driving motor, and the other end of the rotating shaft is connected to the screen, to enable the screen to be fixedly mounted on a wall or a bracket through the rotating component.

8. An image display method, comprising:

in response to a play action of a video media resource of a display device, detecting a current rotating state of a screen of the display device;

in response to the current rotating state of the screen being in a landscape mode and a video media resource being a vertical media resource, controlling a rotating component of the display device to rotate the screen to a portrait mode;

calculating a rotating parameter according to the current rotating state and an aspect ratio of the video media resource, wherein the rotating parameter comprises a display image scaling ratio and/or a rotating angle;

adjusting a display window of the video media resource on the screen according to the rotating parameter;

obtaining a current display window position of the video media resource on the screen;

determining a target display window position according to a current rotating state of the screen;

comparing the target display window position with the current display window position to generate width-height deformations;

determining a scaling step size, wherein the scaling step size is a width-height scaling increment per unit time calculated according to the width-height deformations and a rotating speed of the rotating component; and adjusting width and height values of the display window according to the scaling step size.

9. The method according to claim 8, further comprising:

determining a coordinate of a scaling base point in the current display window; and adjusting synchronously the width and height values of the display window according to the scaling step size with the coordinate of the scaling base point as a reference.

10. The method according to claim 8, further comprising:

determining a window rotating direction, wherein the window rotating direction is opposite to a rotating direction of the screen;

comparing the target display window position with the current display window position to generate an angle deformation; and generating a rotating step size, wherein the rotating step size is an angle rotating increment per unit time calculated according to the angle deformation and a rotating speed of the rotating component.

11. The method according to claim 8, further comprising:

obtaining angle data of the screen in real time by monitoring an angle sensor of the rotating component;

synchronously calculating a rotating parameter of a display window according to the angle data; and adjusting a window for displaying the video media resource according to the rotating parameter.

12. The method according to claim 8, further comprising:

detecting an on/off state of the rotating component;

detecting an aspect ratio of a display window corresponding to the video media resource and the current rotating state of the screen in response to the state of the rotating component being on; and controlling the screen to present a setting interface of the on/off state of the rotating component in response to the state of the rotating component being off.

13. The method according to claim 8, further comprising:

receiving a command for rotating the screen from a user; and sending the command to a driving motor of the rotating component to start rotating.

* * * * *